United States Patent
Kondo

(10) Patent No.: US 10,319,169 B2
(45) Date of Patent: Jun. 11, 2019

(54) MEDIUM PROCESSING APPARATUS AND METHOD OF CONTROLLING THE MEDIUM PROCESSING APPARATUS

(71) Applicant: SEIKO EPSON CORPORATION, Tokyo (JP)

(72) Inventor: Ryota Kondo, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 169 days.

(21) Appl. No.: 15/629,485

(22) Filed: Jun. 21, 2017

(65) Prior Publication Data
US 2017/0372552 A1 Dec. 28, 2017

(30) Foreign Application Priority Data
Jun. 22, 2016 (JP) .................. 2016-123801

(51) Int. Cl.
G07D 7/162 (2016.01)
G01B 11/04 (2006.01)
G07D 7/164 (2016.01)
G01B 11/06 (2006.01)

(52) U.S. Cl.
CPC ............ *G07D 7/162* (2013.01); *G07D 7/164* (2013.01); *G01B 11/043* (2013.01); *G01B 11/0691* (2013.01)

(58) Field of Classification Search
CPC ...... G07D 7/162; G07D 7/164; G01B 11/043; G01B 11/0691
USPC ........................................... 250/559.01
See application file for complete search history.

(56) References Cited

U.S. PATENT DOCUMENTS

| | | | |
|---|---|---|---|
| 8,575,581 B2* | 11/2013 | Murosaki | B65H 7/04 250/559.01 |
| 9,428,354 B1* | 8/2016 | Makida | B65H 5/062 |
| 2009/0254306 A1 | 10/2009 | Ohshima et al. | |
| 2015/0293487 A1 | 10/2015 | Takenaga et al. | |
| 2017/0097601 A1 | 4/2017 | Takenaga et al. | |

FOREIGN PATENT DOCUMENTS

| | | |
|---|---|---|
| JP | 05-294512 A | 11/1993 |
| JP | 2009-249074 A | 10/2009 |
| JP | 2013-001530 A | 1/2013 |
| JP | 2014-101214 A | 6/2014 |
| JP | 2015-205775 A | 11/2015 |

* cited by examiner

*Primary Examiner* — Seung C Sohn
(74) *Attorney, Agent, or Firm* — Foley & Lardner LLP

(57) ABSTRACT

A medium processing apparatus includes a sensor that is intermittently energized and detects a predetermined physical quantity and outputs the detection value in the energization period, the sensor stabilizing its output after an output stabilization period, which is shorter than the energization period, has lapsed, a storage unit that stores the detection value that has been detected by the sensor before the lapse of the energization period and after the lapse of the output stabilization period, and a controller that reads the detection value from the storage unit and performs a predetermined process by using the detection value read.

16 Claims, 4 Drawing Sheets

MEDIUM PROCESSING APPARATUS AND METHOD OF CONTROLLING THE MEDIUM PROCESSING APPARATUS

This application claims priority under 35 U.S.C. § 119 to Japanese Patent Application No. 2016-123801 filed on Jun. 22, 2016, the entire disclosure of which is expressly incorporated by reference herein.

BACKGROUND

1. Technical Field

The present invention relates to a medium processing apparatus and a method of controlling the medium processing apparatus.

2. Related Art

JP-A-2009-249074 and US2009/0254306 describe an example of a medium processing apparatus that includes a sensor, for example, a light-sensitive element such as a photosensor, that detects a predetermined physical quantity. Such a medium processing apparatus performs a predetermined process, for example, multi-sheet feed detection of media, such as paper, by using a value detected by the sensor. "Multi-sheet feed" refers to when more than one sheet of a media is erroneously fed at the same time.

Continuous power supply to the sensor in such a medium processing apparatus damages the sensor. To reduce the damage to the sensor, for example as illustrated in FIG. 5, electric power may be intermittently supplied to the sensor, and sensor output (a detection value) from the sensor may be directly read during period LC, which is during the energization period LA but after the lapse of the output stabilization period LB. FIG. 5 illustrates an example of sensor output from a sensor when the sensor is intermittently supplied with electric power. In FIG. 5, the triangle symbols ▲ in the lower section denote sensor output read timing.

SUMMARY

When a sensor is used that has a relatively long output stabilization period LB during intermittently energization, the medium processing apparatus has only a relatively short period to directly read the output from the sensor, that is, the period LC, which is in the energization period LA and after the lapse of the output stabilization period LB. Consequently, energizatoin of the sensor might end in the middle of the detection, so that appropriate sensor output (a detection value) might not be supplied from the sensor, resulting in the medium processing apparatus being unable to read (use)an appropriate sensor output.

An advantage of some aspects of the invention is that there is provided a medium processing apparatus capable of reading an appropriate sensor output even if a sensor which has a relatively long output stabilization period intermittently energizes is used, and a method of controlling the medium processing apparatus.

According to an aspect of the invention, a medium processing apparatus includes a sensor configured to detect a medium and output a detection value, a storage unit configured to store the detection value, and a controller configured to control the sensor and the storage unit. The controller is configured to intermittently energize the sensor and acquire the detection value from the sensor if the controller acquires the detection value after a lapse of a predetermined period of time since the energization, or acquire the detection value from the storage unit if the controller acquires the detection value after the energization and before the lapse of the predetermined period of time, wherein the period of time is determined in accordance with characteristics of the sensor. In the medium processing apparatus, the period of time may be a period at least from the energization of the sensor to the stabilization of the output. In the medium processing apparatus, the storage unit may be configured to store the detection value obtained from the sensor after the period of time has lapsed.

According to this aspect, as the sensor, even if a sensor that is intermittently energized and has a relatively long output stabilization period is used, a medium processing apparatus capable of reading (acquiring) an appropriate sensor output can be provided.

This can be achieved by the storage unit that stores a detection value detected by the sensor in the period before the lapse of the energization period and after the lapse of the output stabilization period and by the controller that reads (acquires) the detection value from the storage unit without directly reading a sensor output (a detection value) from the sensor.

According to a preferred aspect, the medium processing apparatus may further include a motor configured to transport the medium. The controller intermittently energizes the sensor in synchronization with the driving of the motor.

According to this aspect, even if a sensor that has a relatively long output stabilization period is used, when the sensor is intermittently energized in synchronization with the energization of the motor, an appropriate sensor output can be read.

According to a preferred aspect, the controller may be configured to acquire the detection value from the storage unit after the completion of the energization of the sensor and before the start of the next energization.

According to this aspect, as the sensor, even if a sensor that is intermittently energized and has a relatively long output stabilization period is used, an appropriate sensor output can be read.

This can be achieved by the controller reading a detection value from the storage unit after the lapse of the energization period and before the next energization period.

According to a preferred aspect, the storage unit may be configured to update the detection value every time the sensor is energized.

According to this aspect, the controller can read the latest detection value from the storage unit and perform a predetermined process by using the latest detection value read.

This can be achieved by the storage unit updating the stored detection value to the latest detection value every time the sensor is energized.

According to a preferred aspect, the sensor may be a photosensor.

According to this aspect, as the sensor, even if a photosensor that is intermittently energized and has a relatively long output stabilization period is used, an appropriate sensor output can be read.

According to a preferred aspect, the sensor may be configured to detect a multi-sheet feed of media or the presence of a medium.

According to this aspect, the sensor can appropriately detect a multi-sheet feed of media or the presence of a medium.

According to an aspect of the invention, a method of controlling a medium processing apparatus including a sensor configured to detect a medium and output a detection value and a storage unit configured to store the detection value is provided. The method includes intermittently energizing the sensor and acquiring the detection value from the sensor after a lapse of a predetermined period of time since the energization, or acquiring the detection value from the storage unit after the energization and before the lapse of the predetermined period of time. The period of time is determined in accordance with characteristics of the sensor.

According to this aspect, as the sensor, even if a photosensor that is intermittently energized and has a relatively long output stabilization period is used, a control method of reading (acquiring) an appropriate sensor output can be provided.

This can be achieved by the method that includes storing a detection value detected by the sensor in the storage unit in the period before the lapse of the energization period and after the lapse of the output stabilization period and reading the detection value from the storage unit without directly reading sensor output (a detection value) from the sensor.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
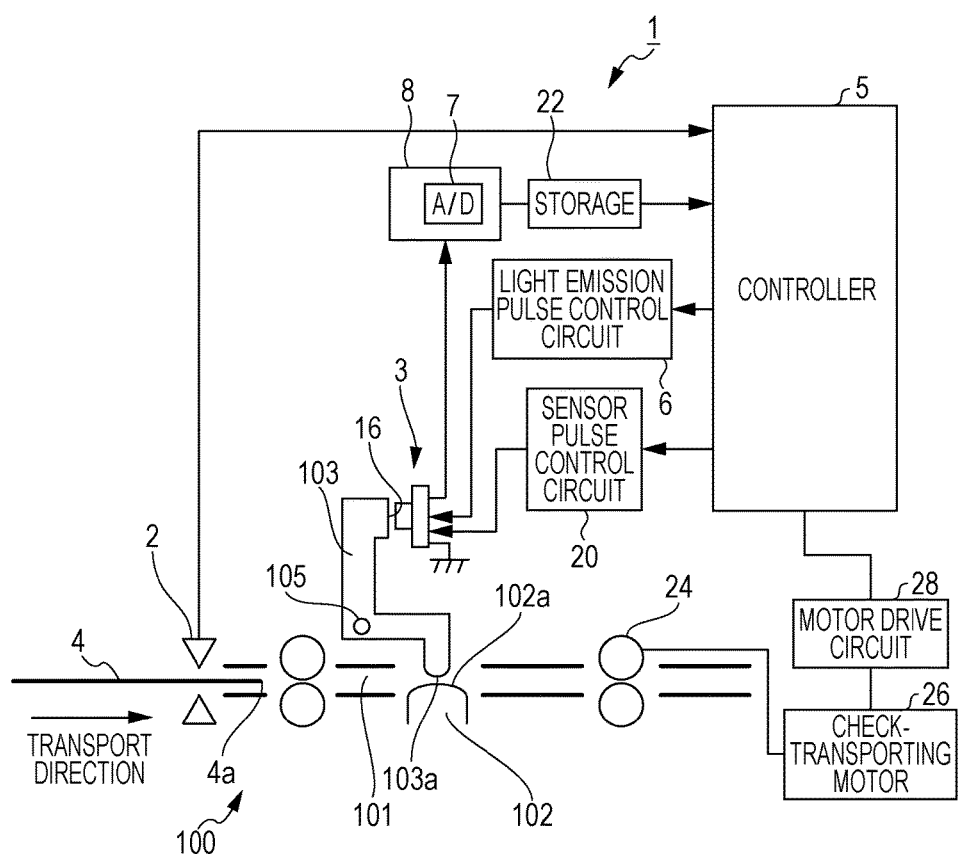
FIG. 1 is a schematic block diagram of the main components of a check processing apparatus.

Hereinafter, a check processing apparatus 1 will be described with reference to the attached drawings, as an embodiment of the medium processing apparatus according to the present invention. In the drawings, the same reference numerals are given to corresponding components, and redundant description thereof will be omitted.

FIG. 1 is a schematic block diagram of the main components of the check processing apparatus 1.

As illustrated in FIG. 1, the check processing apparatus 1 includes, for example, a length detector 2 (hereinafter, referred to as an LD detector 2) disposed in a transport path 101 of a check reading apparatus 100, a thickness detector 3 disposed on the downstream side of the LD detector 2 in the transport path 101, and a controller 5 for detecting multi-sheet feed of checks 4 based on outputs from the LD detector 2 and the thickness detector 3.

Although not shown in the drawings, the controller 5 includes a central processing unit (CPU), which is a processor, a random access memory (RAM), and a read-only memory (ROM). The RAM is used as a work area for the CPU when the CPU performs various processes. The ROM is, for example, a rewritable nonvolatile memory such as a flash ROM, and stores firmware such as a control program. The CPU reads the firmware from the ROM and runs the firmware to control the components in the check processing apparatus 1.

The controller 5 controls a light emission pulse control circuit 6 to turn on a light-emitting diode (LED) 11. The controller 5 also controls a sensor pulse control circuit 20 to drive a sensor 12 (see FIG. 2). Furthermore, the controller 5 retrieves, from a storage unit 22, a value detected by the sensor 12 and performs a predetermined process using the retrieved detection value. The operations of the controller 5 will be described below.

Figure 2:
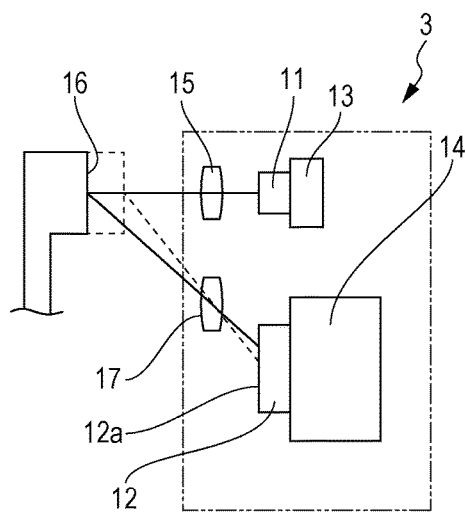
FIG. 2 is a schematic diagram showing structure of a thickness detector.

FIG. 2 illustrates a schematic structure of the thickness detector 3.

As illustrated in FIG. 2, the thickness detector 3 includes the LED 11, the sensor 12, an LED drive circuit 13, and a signal processing circuit 14. The light emitted from the LED 11 is condensed by an emitter lens 15 onto a detection surface 16. The light reflected by the detection surface 16 is condensed by a receiver lens 17 into a spot shape on a light-receiving surface 12a of the sensor 12. The sensor 12 is, for example, a sensor that detects the one-dimensional position of the light condensed into the spot shape on the light-receiving surface 12a, and may be a one-dimensional semiconductor position-detecting element (light-sensitive element), for example, a photosensor such as a photodiode. The sensor 12 outputs, from both terminals, voltages that have been internally divided based on the light-receiving position where the light reflected by the detection surface 16 impinged. The light-receiving position of the reflected light can be detected based on the difference between the potentials at both terminals.

Figure 3:
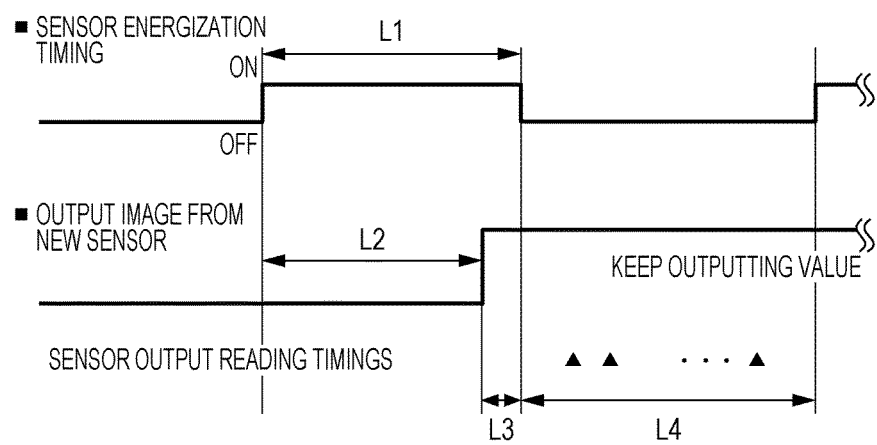
FIG. 3 is a timing chart for explaining characteristics of a sensor.

FIG. 3 illustrates characteristics of the sensor 12. In FIG. 3, the upper section illustrates timing of energizing the sensor 12, and the middle section illustrates an output image of the sensor 12. In FIG. 3, the triangle symbols ▲ in a lower section denote timing of when sensor output that was stored in a storage 22 during timing L3 (to be described later), is retrieved from the storage 22.

As illustrated in the upper section in FIG. 3 the sensor 12 is energized during a period L1 (hereinafter, referred to as an energization period L1), for example, during the first of four steps every time a check-transporting motor 26, which is a stepping motor, rotates four steps. As described above, the sensor 12 is intermittently energized in synchronization with the energization of the check-transporting motor 26. The energization period L1 is, for example, 564 μs (microseconds).

As illustrated in the middle section in FIG. 3, during the energization period L1, the sensor 12 detects (measures) the light-receiving position (the voltage at the light-receiving position of the detected light from the LED 11, to be exact) of the light emitted by the LED 11 and outputs the detection value. After the energization, it takes time for the light-emitting element and/or the light-receiving element to stabilize, and the output of the sensor 12 stabilizes after lapse of an output stabilization period L2, which is shorter than the energization period L1. It should be noted that although there are sensors that have a relatively short (for example, 100 μs) output stabilization period L2, in this embodiment, the sensor 12 that has a relatively long (for example, 500 μs) output stabilization period L2 is used due to circumstances such as low price and availability.

As illustrated in FIG. 1, the detection surface 16 is provided on a rear end surface of a pressure lever 103, which is used to press the check 4 against a magnetic sensitive surface 102a of a magnetic head (magnetic ink character recognition (MICR) head) 102, in the check reading apparatus 100. The pressure lever 103 rotates about a rotational central axis 105 depending on the thickness of the check 4 that passes between its front surface 103a and the MICR head 102. The distance from the rotational central axis 105 to the detection surface 16 is longer than that to the front surface 103a, and a displacement of the front surface 103a is amplified and transmitted to the detection surface 16. The detection surface 16 is displaced toward and away from the thickness detector 3, and the irradiation position of the reflected light on the light-receiving surface 12a in the sensor 12 moves in accordance with the amount of displacement. Consequently, based on a detection signal from the sensor 12, the thickness of the check 4 or the overlap (multi-sheet feed) of the checks 4 that are passing through the MICR head 102, which is the detection position for the thickness detector 3, can be detected. When detecting a multi-sheet feed, the controller 5 performs error processing.

Since the value provided by the sensor 12 is an analog value, the analog value is converted to a digital value by an analog-to-digital (A/D) converter 7 of a signal processing circuit 8. The digitized detection value is stored in the storage unit 22 as describe above. The storage unit 22 may be, for example, a RAM, a rewritable nonvolatile memory such as a flash ROM, or a latch circuit. When a latch circuit is employed, it continuously outputs a currently stored detection value until the next detection value is stored. The storage unit 22 (and the A/D converter 7) may be provided at any location, for example, outside the thickness detector 3 (see FIG. 1) or inside the thickness detector 3.

The controller 5 reads a detection value from the storage unit 22 at a timing described below and performs a predetermined process by using the read detection value. The predetermined process is, for example, a process (multi-sheet feed determining process) for determining whether the checks 4 have been erroneously fed in an overlapped state. The multi-sheet feed determining process is described, for example, in JP-A-2009-046276. It should be noted that the predetermined process is not limited to the multi-sheet feed detection process, and alternatively may be, for example, a process for determining whether or not the check 4 is present. When no check 4 is detected, the controller 5 performs error processing.

A feed roller 24 is connected to the check-transporting motor 26 via a transmission mechanism (not illustrated) such as a speed-reducing gear train. The check-transporting motor 26 is, for example, a stepping motor. The check-transporting motor 26 is driven by a motor drive circuit 28 that is connected to the check-transporting motor 26. The controller 5 controls the motor drive circuit 28 such that phases for driving the check-transporting motor 26 are switched to drive the check-transporting motor 26, and the rotation of the check-transporting motor 26 is transmitted to the feed roller 24 via the transmission mechanism to rotate the feed roller 24.

Next, example operations of the check processing apparatus 1 according to the embodiment will be described with reference to FIG. 4.

Figure 4:
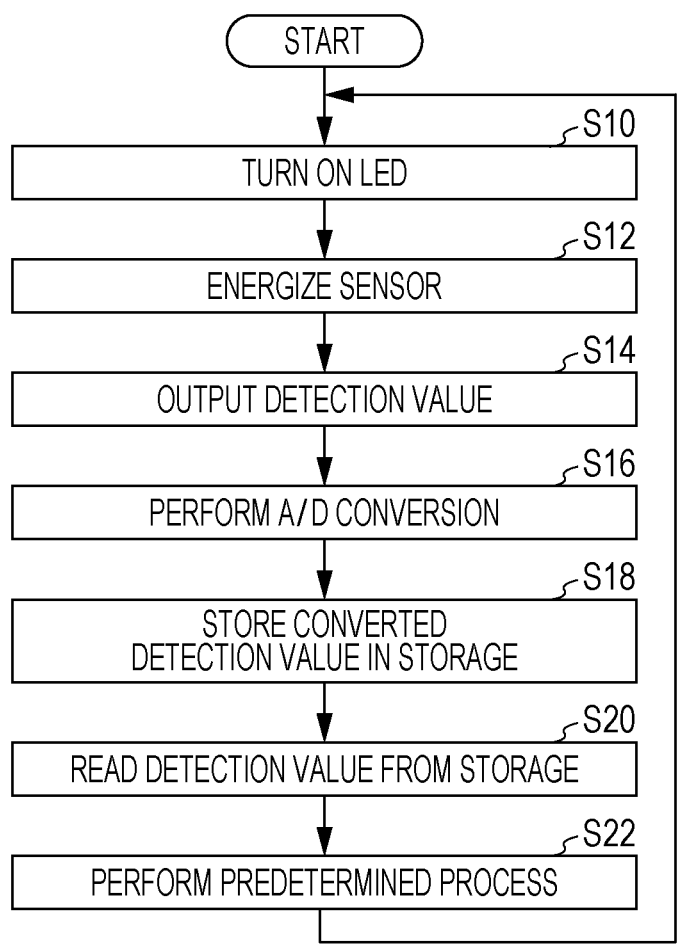
FIG. 4 is a flowchart for explaining example operations of the check processing apparatus according to the embodiment.
Figure 5:
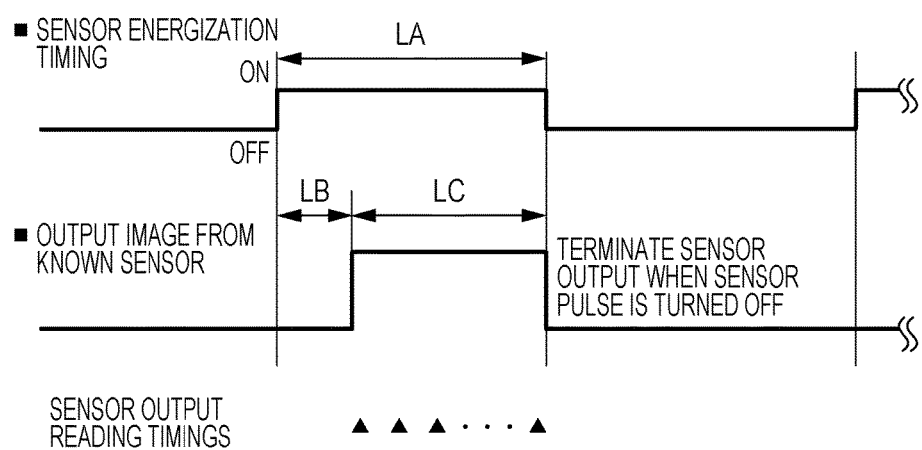
FIG. 5 illustrates example of sensor output from a known sensor when intermittently energized.

FIG. 4 is a flowchart of example operations of the check processing apparatus 1 according to the embodiment.

The processes described below are implemented mainly by the controller 5 (CPU) executing a control program (firmware) that has been stored in a ROM.

First, when the LD detector 2 detects a leading edge 4a of the check 4 that is being transported along the transport path 101, the controller 5 controls the light emission pulse control circuit 6 such that the LED 11 is turned on (step S10). The light emitted from the LED 11 is condensed by the emitter lens 15 onto the detection surface 16. The light reflected by the detection surface 16 is condensed by the receiver lens 17 into a spot shape on the light-receiving surface 12a of the sensor 12. Along with this, the controller 5 energizes the sensor 12 (step S12). Specifically, the controller 5 controls the sensor pulse control circuit 20 such that pulses (for example, see the upper section in FIG. 3) for driving the sensor 12 are supplied to the sensor 12. For example, the pulses for driving the sensor 12 are adjusted to have pulse widths such that each time the check-transporting motor 26 rotates four steps in accordance with switching of phase for energizing the check-transporting motor 26, the sensor 12 is energized for the energization period L1 that corresponds to the first step of the four steps. With these pulses, the sensor 12 is intermittently energized in synchronization with the energization of the check-transporting motor 26.

During the energization period L1, the sensor 12 detects the light-receiving position of the light emitted by the LED 11 and outputs a detection value (step S14).

The detection value detected by the sensor 12 is converted to a digital value by the A/D converter 7 (step S16) and stored in the storage unit 22 (step S18). Specifically, a detection value (in particular, a detection value detected just before termination of the energization to the sensor) detected by the sensor 12 during a period L3, which is a period before the lapse of the energization period L1 and after the lapse of the output stabilization period L2, is stored in the storage unit 22. This process corresponds to a storage process according to the embodiment of the invention. The detection value stored in the storage unit 22 is updated (for example, overwritten) each energization of the sensor 12.

After the energization period L1 has lapsed, the controller 5 accesses the storage unit 22 and retrieves the detection value from the storage unit 22 as indicated by triangles (▲) in FIG. 3 at least once in a period L4 before the next energization period L1 (step S20), and performs a predetermined process by using the detection value read (step S22). Although FIG. 3 shows period L4 stopping at the same time as the rising edge (start) of the next sensor energizations, period L4 actually continues to then end of (and includes) the next output stabilization period L2. In step S20, the controller 5 may also acquire the detection value from the storage unit 22 during this portion of L4, which is after start of the sensor energization shown at the upper right of FIG. 3, and before the lapse of the next output stabilization L2 period of time. This process corresponds to a predetermined process execution process according to the embodiment of the invention. Note that the controller 5 may access the storage unit 22 a plurality of times and retrieve detection values from the storage unit 22 a plurality of times during the period L4 after the energization period L1 has lapsed and before the next energization period L1, and perform a predetermined process by using the average value of the retrieved detection values.

The processes in steps S10 to S22 are performed periodically, for example, every time the check-transporting motor 26 rotates four steps.

As described above, according to this embodiment, even if a sensor (for example, a photosensor) that has the relatively long output stabilization period L2 when intermittently energized in synchronization with energization of the check-transporting motor 26 is used as the sensor 12, the check processing apparatus 1 that can read appropriate sensor outputs and the method of controlling the check processing apparatus 1 can be provided.

This can be achieved by a configuration including the storage unit 22 that stores the detection value detected by the sensor 12 during the period L3, which is the period before the lapse of the energization period L1 and after the lapse of the output stabilization period L2, and the controller 5 that does not directly read the sensor output (detection value) from the sensor 12, but rather retrieves the detection value from the storage unit 22. Furthermore, the controller 5 reads the detection value from the storage unit 22 during period L4, which is the period after the lapse of the energization period L1 and before the next energization period L1.

Furthermore, according to this embodiment, the sensor output (detection value) can be read even while the sensor 12 is not being energized.

Furthermore, according to this embodiment, the controller 5 can read (retrieve) the most recent detection value from the storage unit 22 and perform a predetermined process by using the latest detection value read.

This can be achieved because the detection value stored in the storage unit 22 is updated to the most recent value every time the sensor 12 is energized.

According to this embodiment, the following advantages can be obtained.

For example, when a sensor that has a relatively long output stabilization period L2 when intermittently energized is used as the sensor 12, it is conceivable to extend the period L3, which is the period before the lapse of the energization period L1 and after the lapse of the output stabilization period L2, by extending the energization period L1 to enable the sensor to directly read sensor output (a detection value) from the sensor in the period L3.

However, it is difficult to extend just the energization period L1 when the sensor 12 is intermittently energized in synchronization with the energization of the check-transporting motor 26 as in this embodiment Also, it is undesirable to extend the energization period L1 in order to reduce deterioration of the sensor 12 and ensure an adequate service life of the sensor 12.

According to this embodiment, even in such a case, an appropriate sensor output from the sensor 12 can be read without extending the energization period L1.

Next, modifications will be described.

In the above-described embodiment, a one-dimensional semiconductor position-detecting element (light-receiving element), for example, a photosensor such as a photodiode is used as the sensor 12. However, the invention is not limited to this, and any other type of sensor may be used.

In the above-described embodiment, a sensor that is intermittently energized in synchronization with the energization of the check-transporting motor 26 is used as the sensor 12. However, it is not limited to this. For example, a sensor that is intermittently energized irrespective of the energization of the check-transporting motor 26 may be used as the sensor 12.

In the above-described embodiment, the check processing apparatus 1 is described as an embodiment of the invention. However, the invention is not limited to this, and it should be noted that the invention can be applied to other medium processing apparatus besides the check processing apparatus 1, such as a printer that performs recording onto a medium using a print head.

Furthermore, it should be noted that all numerical values described in the above-described embodiment are only examples, and any appropriate numerical values may be used instead.

The above-described embodiment is merely an example in all respects. The description of the above-described embodiment is not to to be interpreted as limiting the invention. The invention can be implemented in various forms without departing from the spirit or main characteristics of the invention.

What is claimed is:

1. A medium processing apparatus comprising:
   a sensor configured to detect a medium and output a detection value;
   a storage configured to store the detection value; and
   a controller configured to control the sensor and the storage,
   the controller being configured to intermittently energize the sensor, acquire the detection value from the sensor after a lapse of a predetermined period of time from start of energization, and acquire the detection value from the storage after start of energization and before the lapse of the predetermined period of time, wherein the period of time is determined in accordance with characteristics of the sensor.

2. The medium processing apparatus according to claim 1, wherein the period of time is a period at least from the energization of the sensor to the stabilization of the output.

3. The medium processing apparatus according to claim 1, further comprising:
   a motor configured to transport the medium,
   wherein the controller intermittently energizes the sensor in synchronization with driving of the motor.

4. The medium processing apparatus according to claim 1, wherein the storage is configured to store the detection value obtained from the sensor after the period of time has lapsed.

5. The medium processing apparatus according to claim 1, wherein the controller is configured to acquire the detection value from the storage after the completion of the energization of the sensor and before the start of the next energization.

6. The medium processing apparatus according to claim 1, wherein the storage is configured to update the detection value every time the sensor is energized.

7. The medium processing apparatus according to claim 1, wherein the sensor is configured to detect a multi-sheet feed of the media or the presence of the medium.

8. The medium processing apparatus according to claim 1, wherein the sensor is a photosensor.

9. The medium processing apparatus according to claim 1, wherein the storage is a latch circuit.

10. A method of controlling a medium processing apparatus including a sensor configured to detect a medium and output a detection value and a storage configured to store the detection value, the method comprising:
    intermittently energizing the sensor; and
    acquiring the detection value from the sensor after a lapse of a predetermined period of time from start of energization, and acquiring the detection value from the storage after start of energization and before the lapse of the predetermined period of time,
    wherein the period of time is determined in accordance with characteristics of the sensor.

11. The method of controlling the medium processing apparatus according to claim 10, wherein the period of time is a period at least from the energization of the sensor to the stabilization of the output.

12. The method of controlling the medium processing apparatus according to claim 10, further comprising:
    intermittently energizing the sensor in synchronization with the driving of a motor that transports the medium.

13. The method of controlling the medium processing apparatus according to claim 10, further comprising:
    storing the detection value from the sensor after the period of time has lapsed.

14. The method of controlling the medium processing apparatus according to claim 10, further comprising:

acquiring the detection value from the storage after the completion of the energization of the sensor and before the start of the next energization.

15. The method of controlling the medium processing apparatus according to claim 10, further comprising:
updating the detection value every time the sensor is energized.

16. The method of controlling the medium processing apparatus according to claim 10, further comprising:
detecting a multi-sheet feed of the media or the presence of the medium.

* * * * *